United States Patent
Balan et al.

(10) Patent No.: US 11,401,803 B2
(45) Date of Patent: Aug. 2, 2022

(54) DETERMINING FRACTURE SURFACE AREA IN A WELL

(71) Applicant: Saudi Arabian Oil Company, Dhahran (SA)

(72) Inventors: Huseyin Onur Balan, Houston, TX (US); Anuj Gupta, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 705 days.

(21) Appl. No.: 16/355,241

(22) Filed: Mar. 15, 2019

(65) Prior Publication Data

US 2020/0291774 A1   Sep. 17, 2020

(51) Int. Cl.

| | |
|---|---|
| *E21B 49/00* | (2006.01) |
| *E21B 41/00* | (2006.01) |
| *G01V 99/00* | (2009.01) |
| *E21B 47/107* | (2012.01) |
| *E21B 47/07* | (2012.01) |
| *E21B 43/26* | (2006.01) |
| *E21B 47/06* | (2012.01) |

(52) U.S. Cl.
CPC .......... *E21B 49/00* (2013.01); *E21B 41/0092* (2013.01); *G01V 99/005* (2013.01); *E21B 43/26* (2013.01); *E21B 47/06* (2013.01); *E21B 47/07* (2020.05); *E21B 47/107* (2020.05)

(58) Field of Classification Search
CPC ...................................................... E21B 49/00
See application file for complete search history.

(56) References Cited

U.S. PATENT DOCUMENTS

| | | |
|---|---|---|
| 5,794,316 A | 8/1998 | Anscher |
| 6,691,037 B1 | 2/2004 | Poe et al. |
| 7,082,993 B2 | 8/2006 | Ayoub et al. |
| 7,134,492 B2 | 11/2006 | Willberg et al. |
| 7,472,748 B2 | 1/2009 | Gdanski et al. |
| 7,777,606 B2 | 8/2010 | Akbar et al. |
| 7,819,181 B2 | 10/2010 | Entov et al. |
| 8,162,049 B2 | 4/2012 | Rose |
| 8,275,593 B2 | 9/2012 | Zhao |
| 8,498,852 B2 | 7/2013 | Xu et al. |
| 8,606,524 B2 | 12/2013 | Soliman |
| 8,731,889 B2 | 5/2014 | Du et al. |
| 9,470,086 B2 | 10/2016 | Khalid et al. |
| 9,732,592 B2 | 8/2017 | Carvajal et al. |

(Continued)

FOREIGN PATENT DOCUMENTS

WO   2017041074   3/2017

OTHER PUBLICATIONS

Clarkson et al. (Integration of microseismic and other post-fracture surveillance with production analysis: A Tight Gas Study. Journal of Natural Gas Science and Engineering, 3(2), (2011) 382-401) (Year: 2011).*

(Continued)

*Primary Examiner* — John E Breene
*Assistant Examiner* — Jeffrey C Morgan
(74) *Attorney, Agent, or Firm* — Fish & Richardson P.C.

(57) ABSTRACT

A system and method to determine effective fracture surface-area per cluster of hydraulic fractures of a hydraulically-fractured well by estimating total effective fracture-area associated with a wellbore and estimating relative distribution of effective fracture surface-area along the wellbore.

29 Claims, 5 Drawing Sheets

(56) References Cited

U.S. PATENT DOCUMENTS

| | | | |
|---|---|---|---|
| 10,494,918 B2* | 12/2019 | Coenen | G06F 30/20 |
| 2007/0272407 A1 | 11/2007 | Lehman et al. | |
| 2008/0091396 A1 | 4/2008 | Kennon et al. | |
| 2009/0065253 A1* | 3/2009 | Suarez-Rivera | E21B 43/17 |
| | | | 175/50 |
| 2010/0256964 A1 | 10/2010 | Lee et al. | |
| 2012/0239363 A1 | 9/2012 | Durrani et al. | |
| 2012/0318500 A1 | 12/2012 | Urbancic et al. | |
| 2013/0231910 A1 | 9/2013 | Kumar et al. | |
| 2013/0332132 A1 | 12/2013 | Mongalvy et al. | |
| 2014/0067353 A1 | 3/2014 | Shelley et al. | |
| 2014/0083687 A1* | 3/2014 | Poe | E21B 43/26 |
| | | | 166/250.1 |
| 2016/0042272 A1 | 2/2016 | Mohaghegh | |
| 2016/0138371 A1 | 5/2016 | Loaiza et al. | |
| 2016/0356125 A1 | 12/2016 | Bello et al. | |
| 2017/0074770 A1 | 3/2017 | Fourno et al. | |
| 2017/0075001 A1 | 3/2017 | McColpin et al. | |
| 2017/0191348 A1 | 7/2017 | Al-Thawad et al. | |
| 2018/0148999 A1* | 5/2018 | Roussel | E21B 47/06 |
| 2018/0230782 A1 | 8/2018 | Pankaj et al. | |
| 2019/0145251 A1* | 5/2019 | Johnson | E21B 47/06 |
| | | | 166/250.1 |

OTHER PUBLICATIONS

International Search Report and Written Opinion issued in International Application No. PCT/US2020/022322 dated Jul. 3, 2020, 16 pages.

Clarkson et al., "Integration of microseismic and other post-fracture surveillance with production analysis: A tight gas study," Journal of Natural Gas Science and Engineering, vol. 3, No. 2, Mar. 25, 2011, 20 pages.

GCC Examination Report in Gulf Cooperation Council Appln. No. GC 2020-39373, dated Oct. 18, 2021, 6 pages.

* cited by examiner

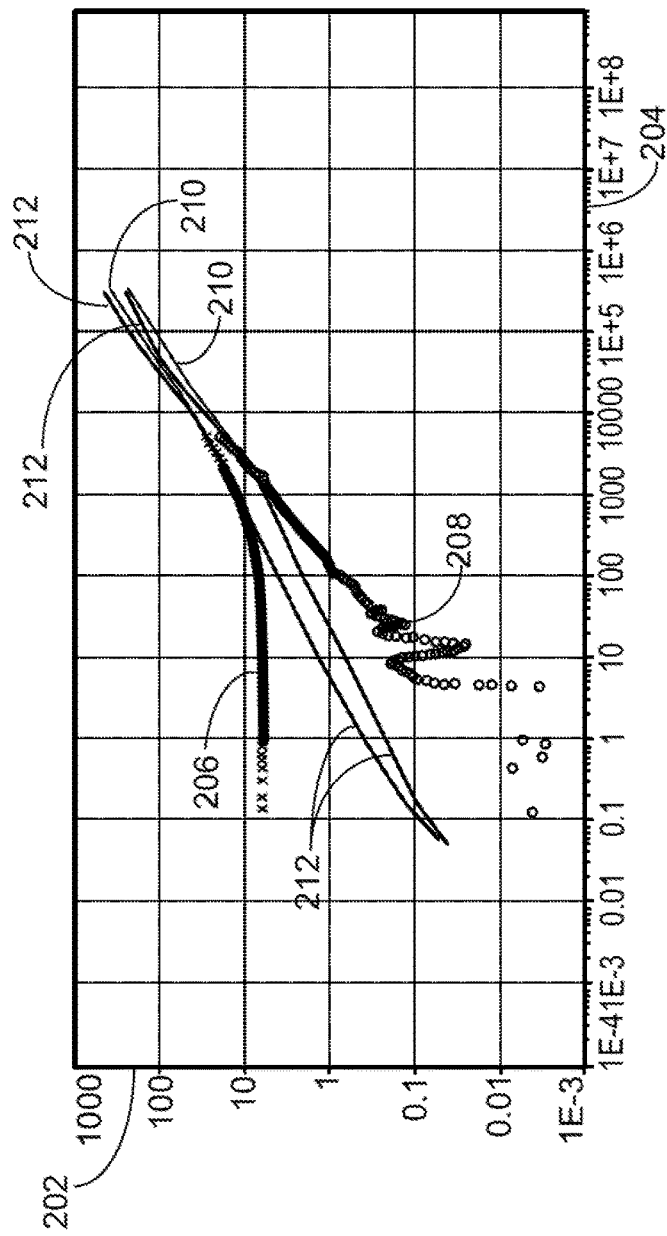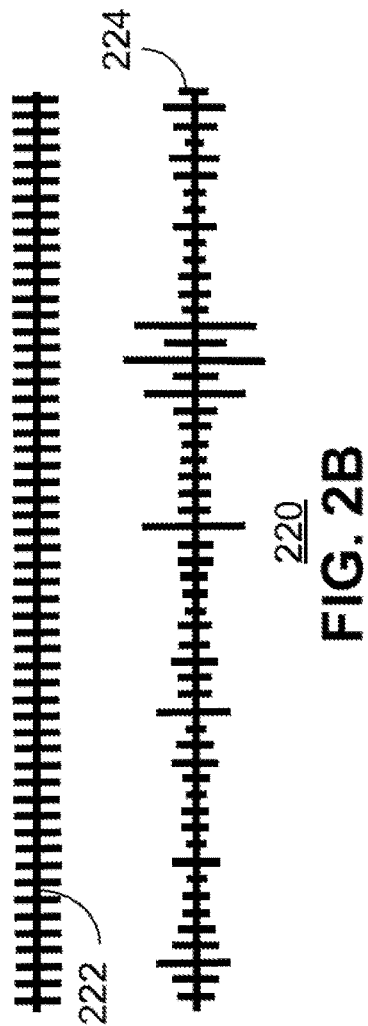
FIG. 2A
FIG. 2B

DETERMINING FRACTURE SURFACE AREA IN A WELL

TECHNICAL FIELD

This disclosure relates to hydrocarbon production through hydraulic fractures along a wellbore in a well.

BACKGROUND

Hydraulic fracturing is generally applied after a borehole is drilled and a wellbore formed. Hydraulic fracturing employs fluid and material to create fractures in a geological formation in order to stimulate production from oil and gas wells. The fracturing can generate paths that increase the rate at which production fluids can be produced from the reservoir formation. The process typically involves injection of fracturing fluid into a wellbore to generate cracks in the rock formations through which natural gas, petroleum, and brine will flow more freely. The fracturing may increase production from the formation. The amount of production may be related to the amount of fracturing. Hydraulic fracturing may be employed in rocks such as tight sandstone, shale, and coal beds. Hydraulic fracturing may allow for the recovery of oil and natural gas from formations that geologists once believed were impossible to produce, such as tight shale formations.

SUMMARY

An aspect relates to a method of a computer-implemented workflow, including determining effective fracture surface-area per cluster of hydraulic fractures of a hydraulically-fractured well. The determining of the effective fracture surface-area per cluster includes estimating total effective fracture surface-area associated with a wellbore of the hydraulically-fractured well and estimating relative distribution of effective fracture surface-area along the wellbore. The determining of the effective fracture surface-area per cluster includes estimating effective fracture surface-area per cluster of hydraulic fractures along the wellbore correlative with the total effective fracture surface-area and the relative distribution.

Another aspect relates to a computer-implemented method including obtaining data of well parameters of a hydraulically-fractured well, integrating a model with the data, and estimating effective fracture surface-area per cluster of hydraulic fractures along a wellbore of the hydraulically-fractured well having multiple clusters of hydraulic fractures along the wellbore.

Yet another aspect relates to a computing system having an estimator to determine effective fracture surface-area per cluster of hydraulic fractures of a hydraulically-fractured well. To determine the effective fracture surface-are per cluster includes to estimate total effective fracture surface-area associated with a wellbore of the hydraulically-fractured well, estimate relative distribution (non-uniform) of effective fracture surface-area along the wellbore via an analytical model or numerical model, and estimate effective fracture surface-area per cluster of hydraulic fractures along the wellbore correlative with the total effective fracture surface-area and the relative distribution.

Yet another aspect relates to a computing system for determining effective fracture surface-area per cluster of hydraulic fractures of a hydraulically-fractured well. The computing system includes a processor and memory storing code executable by the processor to direct the computing system to: estimate total effective fracture surface-area associated with a wellbore of the hydraulically-fractured well via rate transient analysis (RTA); estimate relative distribution of effective fracture surface-area along the wellbore via a model, where the relative distribution is non-uniform; and estimate effective fracture surface-area per perforation cluster of hydraulic fractures along the wellbore correlative with the total effective fracture surface-area and the relative distribution.

Yet another aspect relates to a non-transitory, computer-readable medium storing instructions executable by a processor of a computing device to: estimate total effective fracture surface-area associated with a wellbore of a hydraulically-fractured well via rate transient analysis (RTA); estimate relative distribution of effective fracture surface-area along the wellbore via an analytical model or numerical model, where the relative distribution is non-uniform; and estimate effective fracture surface-area per cluster of hydraulic fractures along the wellbore correlative with the total effective fracture surface-area and the relative distribution.

The details of one or more implementations are set forth in the accompanying drawings and the description later. Other features and advantages will be apparent from the description and drawings, and from the claims.

BRIEF DESCRIPTION OF DRAWINGS

FIG. 2A is a plot of normalized gas potential versus material balance time referring to the cases in FIG. 2B FIG. 2B is sample top view representations of uniform and non-uniform relative distribution of effective fracture lengths along a wellbore trajectory for a fixed fracture height, and with both cases representing the same total effective fracture surface-area.

Like reference numbers and designations in the various drawings indicate like elements.

DETAILED DESCRIPTION

Figure 1:
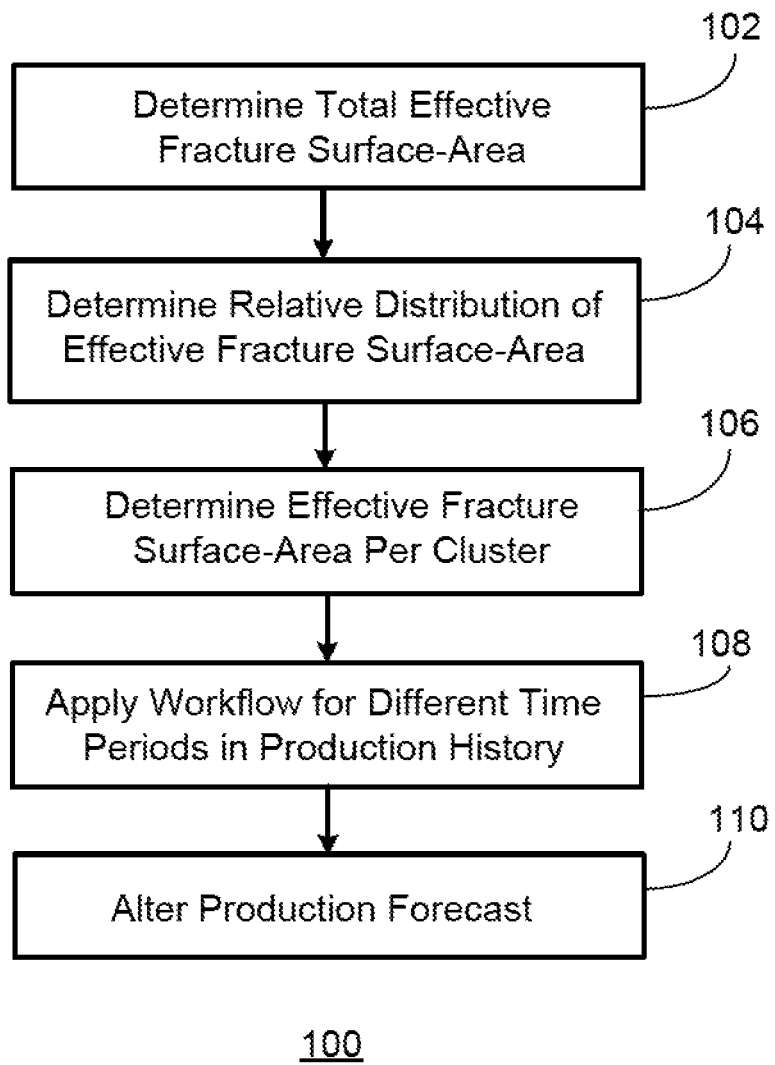
FIG. 1 is a block flow diagram of a method of a computer-implemented workflow for determining effective fracture surface-area per cluster of hydraulic fractures.

This disclosure relates to determining fracture surface-area in a hydraulically-fractured well. Embodiments may determine the effective fracture surface-area of hydraulic fractures along a wellbore including per cluster of hydraulic fractures. The "effective" fracture surface-area may be defined as fracture surface area contributing to fluid flow from the geological formation into the wellbore. The total effective fracture surface-area may be defined as total propped and unpropped fracture surface-area contributing to fluid flow from reservoir matrix to the wellbore. The fluids may include oil, gas, and water. The hydraulically-fractured well may include multiple clusters of hydraulic fractures along the wellbore. In implementations, the multiple clusters are formed through respective wellbore perforations. A cluster of hydraulic fractures formed through a wellbore perforation may include a group of hydraulic fractures including a primary fracture(s) and secondary fractures. The cluster may include planar fractures, tensile fractures, shear fractures, and complex fractures.

The surface area of a hydraulic fracture may be the sum of the surface area of the two-dimensional (2D) surfaces of the fracture. The units of measure of fracture surface area may be, for example, in square meters or square feet.

The effective fracture surface-area of the sum of hydraulic fractures associated with perforation clusters in a wellbore should be the "total" effective fracture surface-area for all of the perforation clusters along the wellbore. The effective fracture surface-area may vary among respective perforation clusters present in a wellbore. A "distribution" of effective fracture surface-area, which describes such variation in effective fracture surface-area, may be considered along the wellbore trajectory. The distribution may cumulatively sum to the total effective fracture surface-area. The distribution along a longitudinal or axial length of the wellbore may include effective fracture surface-area per unit length of the wellbore, per segment or section of the wellbore, and per perforation cluster. The effective fracture surface-area along the wellbore may be non-uniform and thus the relative distribution may indicate a changing value of effective fracture surface-area along the wellbore.

Some aspects of the present techniques are directed to estimating or determining distribution of effective fracture surface-areas in a hydraulically-fractured well. The well may be horizontal, deviated, or vertical. A "relative" distribution may be considered in that the distribution may be non-uniform along the wellbore trajectory.

Accurate predictions of hydrocarbon rates and recovery from hydraulically-fractured horizontal wells in unconventional reservoirs may depend on accurate characterization of hydraulic fractures. The characterization may include height, half-length, and conductivity of the hydraulic fractures. Overall or total effective surface-area of the hydraulic fractures can be estimated by analyzing rate and pressure data with reservoir models or reservoir engineering. However, fracture surface area associated with individual perforation clusters of hydraulic fractures has typically been unknown for a given formation or well. Such lack of knowledge can introduce uncertainty in the prediction of hydrocarbon rates and recovery, and therefore adversely affect production forecasts. Further, while hydraulic-fracture propagation models can provide estimates of fracture size, the estimates typically do not address effective surface area. The effective surface area (surface area that contributes to flow) can be different than the surface area associated with the fracture size provided by the model estimates. Moreover, while aggressive depletion may theoretically increase the flow potential, an associated decrease in effective fracture surface-area may counter some of the benefit of aggressive depletion.

Knowledge of the relative contribution of individual perforation clusters to the total flow may aid evaluation of drawdown strategy to increase production rates or recovery. Field development plans may consider cash flow analysis which can depend on rate and recovery estimates. Information of how fracture surface areas are distributed along the wellbore trajectory may play a role. In addition, learning the non-uniform fracture distribution may also facilitate decisions of well spacing to prevent or reduce well interferences and where to refracture if needed.

The techniques may determine relative distribution of hydraulic fracture surface-area along the wellbore trajectory. This information may be beneficial for accurate estimation of ultimate recovery and, therefore, for project economics and improved field development. Embodiments of the present techniques may give improvement in predictions of rates and recovery.

Implementations may include a system and method to estimate effective surface area for each cluster individually by integrating analytical and numerical simulation models with reservoir monitoring data and petrophysical data. Such determination of effective surface area per cluster may improve hydrocarbon rate and recovery estimates from hydraulically-fractured wells. Embodiments include at least deviated or horizontal wells in an unconventional reservoir. The evaluation may recognize that reservoir pressure and well pressure at each cluster may be different. For a given cluster, the surface areas and production rates may be considered, measured, or calculated independent of other clusters.

The present techniques may incorporate real-time fiber optic monitoring data, in conjunction with analytical and numerical reservoir simulation models, to obtain effective fracture surface-area (and fracture conductivity) with depletion. The incorporation of fiber-optic monitoring data may facilitate improvement or optimization of drawdown strategy. Inclusion of real-time fiber optic monitoring data may be integrated with well flow models (for example, the data as inputs and for calibration) so that drawdown strategy can be improved or optimized, for example, to manage liquid loading. Real-time fiber optic monitoring data may also be considered independent of models. The fiber optic monitoring or other sensing techniques that measure pressure, temperature and rates at one or more locations along the wellbore length can be employed with reservoir engineering models including analytical and numerical reservoir simulation models to obtain effective fracture surface-area (and conductivity) with depletion. Such data and evaluations can aid development of drawdown strategy. Reservoir pressure at the respective locations of fracture clusters may be considered. The reservoir pressure at each location of a fracture cluster may incorporated into the reservoir engineering models.

As mentioned, accurate predictions of hydrocarbon production rates and recovery from hydraulically fractured horizontal wells in unconventional reservoirs may depend on accurate characterization of hydraulic fractures created in terms of their height, half length, and conductivity. Total effective fracture surface-area may be estimated by analyzing rate and pressure data with reservoir engineering techniques such as rate transient analysis (RTA), numerical simulations, and material balance. However, effective fracture area created for each individual clusters has typically been an unknown. Lack of this knowledge of effective fracture area per each cluster may introduce unacceptable uncertainties in predictions of rates and recovery. In contrast, present embodiments estimate the distribution of effective fracture surface-area per cluster. This estimation or determination may be implemented by integrating classical reservoir engineering analysis with distributed reservoir monitoring data along the wellbore trajectory.

Real-time or time-delayed distributed monitoring, tracer injection tests, and production logging may aid in evaluation of the relative contribution of individual clusters to the total production flow. The distributed monitoring may measure pressure, temperature, flow rate, and acoustic level. The distributed monitoring and measuring may be, for example, via fiber optic cables or multiple sensors installed along the well trajectory or wellbore. Moreover, intra-cluster and intra-well interferences during fracturing and production may be detected with implementation of these monitoring techniques. Real-time or time-delayed monitoring may also facilitate evaluation of the changes in effective area and conductivity of hydraulic fractures due to closure, and evaluation of how the individual contribution of each cluster to the total flow stream changes with pressure depletion. Although increasing rate of depletion may tend to increase the flow potential, an associated reduction in effective fracture surface-area may counter some of the benefit. These aforementioned features and considerations may facilitate evaluation and improvement of drawdown strategy to increase rates or recovery.

Another benefit of real-time (or time-delayed) monitoring is to observe and analyze how wellbore flow dynamics change with increasing depletion. Such monitoring data can be employed to calibrate numerical well-flow models by tuning parameters to increase or optimize deliverability of the well in the presence of liquid loading. In certain implementations, numerical or analytical simulation-model results of hydraulically fractured wells (for example, horizontal wells) may be calibrated with the measured data including pressure, rate, and total production.

In summary, embodiments may facilitate estimating effective surface-area created per individual cluster by integration of overall effective surface-area estimated with reservoir engineering techniques and utilizing data sets from reservoir monitoring technologies. Predictions of rates and recovery may be improved with the additional information of effective fracture surface-area distribution along the well trajectory.

FIG. 1 is a method 100 of estimating or determining fracture surface-area in a hydraulically-fractured well. The well may include a deviated or horizontal wellbore in a geological formation. The geological formation has rock and fluid. Rock types can include shale, carbonate, and tight sands. The formation rock may be heterogeneous. Calculations giving numerical values for effective fracture surface-area (for example, in square meters) may be associated with method blocks 102, 104, and 106 discussed later.

The method 100 may be a computer-implemented method. For example, code (instructions, logic) stored in memory of a computing system may be executed by a processor of the computing system to direct the processor to perform the actions of method 100. The method 100 can be a workflow for determining total effective fracture surface-area along a wellbore of a hydraulically-fractured well. The hydraulically-fractured well may include multiple clusters of hydraulic fractures formed through wellbore perforations along the wellbore.

At block 102, the method includes determining total effective fracture surface-area of hydraulic fractures associated with a well or wellbore by performing a model or reservoir engineering such as RTA. The relative distribution of effective fracture surface-area along the wellbore trajectory may be determined based, for example, at least in part on an analysis with well monitoring data such as distributed acoustic sensing (DAS), distributed temperature sensing (DTS), and production logging (PLT). The estimating of total effective fracture surface-area may include estimating total effective fracture surface-area of clusters of hydraulic fractures associated with the wellbore of the hydraulically-fractured well. An output of this block 102 action may be total effective fracture surface-area, for example, in square meters (m2) or square feet (ft2).

The RTA may be performed to estimate total effective surface-area using rate and pressure history, pressure-volume-temperature (PVT) relationships, completion information, well logs, core data, and a geological model. Inputs can include history of production rate and well pressure. The hydrocarbon produced can be crude oil or natural gas, or both. Inputs can include PVT conditions in the wellbore. Inputs to the RTA can include the wellbore trajectory and also detail of the clusters of hydraulic factures. The wellbore trajectory may be the direction(s) in which the well or wellbore is drilled, the size of the wellbore, and the length of the wellbore. The fracture cluster details can include fracture cluster spacing and the number of fractures per cluster. Further, inputs to the RTA can include well logs, core sample data, and geological models of the geological formation. In a hypothetical example case with 100 perforation-clusters, 100-feet fracture height, and 500-feet average effective fracture half-length, the total effective fracture area may be estimated to be about 20 million square feet.

At block 104, the method includes determining or estimating the relative distribution of effective fracture surface-areas along the wellbore trajectory. The output can be percent (%) of total effective fracture surface-area per unit length or perforation-cluster (for example, % per meter or per perforation-cluster). The distribution may cumulatively sum to the total effective fracture surface-area. In the aforementioned hypothetical example case, the percentage of total effective fracture surface-area per perforation-cluster may vary from 0.0% to 5%.

In embodiments, the relative distribution of the effective fracture surface-area may be estimated by employing analytical or numerical flow models and via distributed monitoring data along the wellbore. The flow in the models can refer to produced flow (for example, including hydrocarbon) from the geological formation through the hydraulic fractures into the wellbore. The hydrocarbon (for example, oil and gas) and additional fluids present in the geological formation may flow from the hydraulic fractures through wellbore casing perforations into the wellbore. The flow models may be analytical, numerical, and hybrid. Analytical and numerical reservoir simulation models may be employed. In some implementations, an analytical linear-flow model for a hydraulically-fractured well is utilized. In one example, the analytical linear flow-model solution presented in Equations 1.1-1.4 is employed.

Inputs for estimating the relative distribution of effective fracture surface-area may include distributed monitoring data along the wellbore trajectory. Such may be provided by production logs and fiber-optics. While logs may characterize the wellbore, formation, and fluids prior to well completion, logging tools may be employed to provide information during production operations. The production logs and associated tools may give axial flow rate or velocity, pressure, temperature, and fluid density, of production. Production logging tools may be run in completed wells to ascertain the nature and behavior of fluids in or around the borehole during production.

Furthermore, fiber-optic systems may be employed to enable direct conversion of downhole measurements into optical signals, such as in measuring real-time temperature and pressure data down the wellbore. Fiber-optic monitoring or sensing may include distributed temperature and acoustic sensing, pressure and temperature measurements, and evaluation of fluid movement over time within the wellbore. Fiber optic monitoring services can include a portfolio of distributed and point sensors along the wellbore trajectory to evaluate a wellbore in well operation.

The in-well fiber optic monitoring systems may be installed in wells for monitoring pressure (for example, discrete pressure), temperature, flow rate, phase fraction, and seismic. The fiber-optic system can include fiber optic sensors including, for example, fiber-optic pressure sensors and distributed temperature sensors (DTS). The fiber-optic system can include, for example, transducers and fiber optic cables, fibers, and connectors. Downhole sensors or gauges other than fiber-optics, as well as supervisory control and data acquisition (SCADA), may be employed for sensing, measuring, and collecting data.

The distribution of effective fracture surface-area along a longitudinal or axial length of the wellbore may be effective fracture surface-area per unit length of the wellbore (or per segment, section, or cluster of the wellbore), and may be non-uniform. The effective surface area per unit length may vary along the axial length of the wellbore. The relative distribution of the effective surface may be determined per different longitudinal segments or axial sections of the wellbore. In some implementations, the relative distribution may be in percent of the total effective surface-area per unit length along the wellbore, and in which the percent may not be constant but instead changes along the wellbore. The estimating of relative distribution (non-uniform) may include estimating relative distribution of effective fracture surface-area of the perforation clusters along the wellbore.

At block 106, the method includes determining the effective fracture surface-area per cluster of hydraulic fractures. The units of measure of this output may be m2 per cluster or ft2 per cluster. The determining may involve calculating and estimating the effective fracture surface-area per cluster. The determining may involve determining effective fracture surface-area per each cluster of hydraulic fractures of the hydraulically-fractured well. The effective fracture surface-area of a first cluster may be different than effective fracture surface-area of a second cluster. The effective fracture surface-area per cluster may be calculated, for example, by integrating the information obtained from blocks 102 and 104.

The determining of the effective fracture surface-area per cluster may include constraining the relative distribution of effective fracture surface-areas with the total effective fracture surface-area estimated via the RTA (block 102). The summation of the estimated effective fracture surface-area per cluster may be fitted partially or fully to the total effective fracture surface-area determined via the model (for example, RTA) in block 102. The estimated production per cluster may also be similarly constrained. In the aforementioned hypothetical example case, the effective fracture surface-area per perforation-cluster, calculated by integrating the information obtained from blocks 102 and 104, may vary from 0.0 to 1.0 million square feet. Block 106 may combine the results of block 102 (total effective fracture surface-area) with the results (relative distribution) of block 104.

At block 108, the method may include applying the workflow blocks 102, 104, and 106 for different time periods in production history to estimate how effective fracture surface-area per each cluster or fracture changed with time or depletion. This historical evaluation may be based on, for example, historical real-time distributed monitoring data (for example, collected via fiber optics). The method may alter or adjust the drawdown strategy to increase recovery in response to this historical analysis. The method may include determining a drawdown strategy in response to reduction in the effective fracture surface-area per cluster over time or depletion. The determination may be performed with or without the historical analysis.

At block 110, the method may alter or generate a production forecast based on determined variation in effective fracture surface-area per cluster along the wellbore trajectory. The determined variation may be per blocks 102, 104, and 106, and optionally including block 108. The variation of effective fracture surface-area along the well trajectory may be an input for analytical or numerical flow models to improve or alter production forecasts. The production forecast may be for a single well or multiple wells, and may be a simple forecast, a complex forecast, or simulated forecast. A forecast may consider production start rate and decline rate in some instances, and may incorporate various declines such as exponential, linear, harmonic, and hyperbolic. The estimated ultimate recovery (EUR) may be considered. Of course, the present techniques are not limited to a particular type of production forecast. Again, a production forecast may be generated, altered, or revised in response to the earlier-discussed estimation of effective fracture surface-area per each cluster along the wellbore trajectory.

An analytical linear flow model solution (Equations 1.1-1.4 or Equations 1.1-1.7) for a hydraulically fractured well is provided as an example. This example model solution may involve the constant bottom-hole pressure solution for the transient linear-flow equation for liquid such as crude oil that is to some extent compressible. Equations 1.1-1.4 is also applicable for gas well with pressure terms in Equation 1.1 replaced by pseudo pressure, m(P), which is provided in Equation 1.5. This modification may be implemented to consider pressure dependency of natural gas density and natural gas viscosity.

$$\frac{P_i - P_{wf}}{q_j} = C_1 \frac{B}{A_{f,j}} \sqrt{\frac{\mu t}{k_j \varphi_j c_t}} \qquad \text{Eq. 1.1}$$

$$A = \sum A_{f,j} \qquad \text{Eq. 1.2}$$

$$Q = \sum q_j \qquad \text{Eq. 1.3}$$

$$\frac{q_j}{Q} = \frac{A_{f,j}}{A} \sqrt{\left(\frac{k_j}{k_{avg}}\right)\left(\frac{\varphi_j}{\varphi_{avg}}\right)} \qquad \text{Eq. 1.4}$$

$$m(P) = 2 \int_0^P P \frac{dP}{\mu_g z} \qquad \text{Eq. 1.5}$$

$$m_{Norm}(P) = P_{ref} \frac{m(P)}{m(P_{ref})} \qquad \text{Eq. 1.6}$$

$$t_{mb} = \frac{Q(t)}{q(t)} \qquad \text{Eq. 1.7}$$

$A_{f,j}$=fracture surface area for cluster j
A=total fracture surface area
B=formation volume factor
$c_t$=total compressibility
$k_j$=average formation permeability near cluster j
$k_{avg}$=average formation permeability
m(P)=pseudo pressure
m($P_{ref}$)=pseudo pressure at $P_{ref}$
P=pressure
$P_i$=initial reservoir pressure
$P_{wf}$=well flowing pressure $P_{ref}$=reference pressure
$t_{mb}$=material balance time
Q=total flow rate
$q_j$=individual flow rate from cluster j
z=compressibility factor
$\varphi_j$=average porosity near cluster j
$\varphi_{avg}$=average formation porosity
$\mu_g$=gas viscosity Assumptions for this linear flow model solution may be that the fluid is incompressible, the initial reservoir pressure and well flowing bottom-hole pressure are constant along the horizontal trajectory, and the permeability and porosity may vary along the trajectory. The direct measurement of bottom-hole flow can relax the assumption of the bottom-hole pressure as constant along the horizontal trajectory. Ratios of $$\left(\frac{k_j}{k_{avg}}\right) \text{ and } \left(\frac{\varphi_j}{\varphi_{avg}}\right)$$

may be obtained from well logs and core data. The ratio $q_j/Q$ can be obtained from production logs, or calculated indirectly from fiber optic data such as DAS and DTS. In addition to the analytical models, complex numerical simulation models based on geological information can be built to history match measured responses to estimate individual surface area for each cluster. Numerical reservoir simulators coupled with dynamic well flow simulation models can help to eliminate the assumption of constant bottom-hole pressure along the wellbore trajectory. In analytical models, it may also be assumed that the initial reservoir pressure is the same for all clusters. However, for an unconventional reservoir, such assumption may not be true. Therefore, reservoir pressure at each cluster may be determined or considered. The EUR may be the amount of oil and gas expected to be economically recovered from a well (or reservoir, field, or basin) by the end of the producing life. The following discussion demonstrates impact on EUR by non-uniform distribution of fracture surface area along the wellbore trajectory. Rate transient analysis was conducted based on pressure and rate data for a hydraulically-fractured horizontal well in an unconventional reservoir. Results are given in FIG. 2A.

FIG. 2A is a plot 200 of normalized gas potential 202 (pounds per square inch) and its derivative versus material balance time 204 (hours), and referring to cases in FIG. 2B. Normalized gas potential is pseudo gas pressure normalized to a reference pseudo gas pressure and then multiplied by reference pressure as in given in Equation 1.6. Material balance time is the ratio of instantaneous cumulative production to instantaneous rate. The normalized gas potential may be related to EUR.

FIG. 2A indicates that both uniform 212 and non-uniform 210 hydraulic fracture distribution models matches the plot of normalized gas potential versus material balance time 206 and its derivative 208 for field data relatively well. Total fracture surface-area estimated by each model is the same. However, production forecasts are different. See FIG. 3. Curves 210 are output for non-uniform hydraulic-fracture distribution models. Curves 212 are output for uniform hydraulic-fracture models.

FIG. 2B is sample top view representations of uniform and non-uniform relative distribution of effective fracture lengths along a wellbore trajectory for a fixed fracture height, and with both cases representing the same total effective fracture surface-area. FIG. 2B gives diagram representations 220 of the distribution of hydraulic fractures or effective fracture lengths along a wellbore trajectory for the cases discussed with respect to FIG. 2A. The assumption for these cases is that hydraulic fracture height is the same for all clusters, but such may not be so. The cases are the uniform case 222 and the non-uniform case 224. The respective diagrams 222 and 224 for these cases can be interpreted as a two-dimensional (2D) depiction of the magnitude of hydraulic fractures or effective fracture surface-area around the depicted centerline as the wellbore. In both respective cases of the diagram 222 and diagram 224, the total fracture surface-area is the same and obtained from RTA. The non-uniform 224 distribution is based on analysis of production logs with Equations 1.1-1.4.

In FIGS. 2A and 2B, the model curves 212 for the uniform 222 fracture distribution case and the model curves 210 for the non-uniform 224 fracture distribution case match the corresponding field data 206, 208. Again, in both cases, total effective fracture surface-area is equal to each other, and obtained from RTA. The curves 210 for the non-uniform 224 distribution is based on analytical simulation model using a transient linear flow equation similar to Equation 1.4 with integration of petrophysical and production data.

Figure 3:
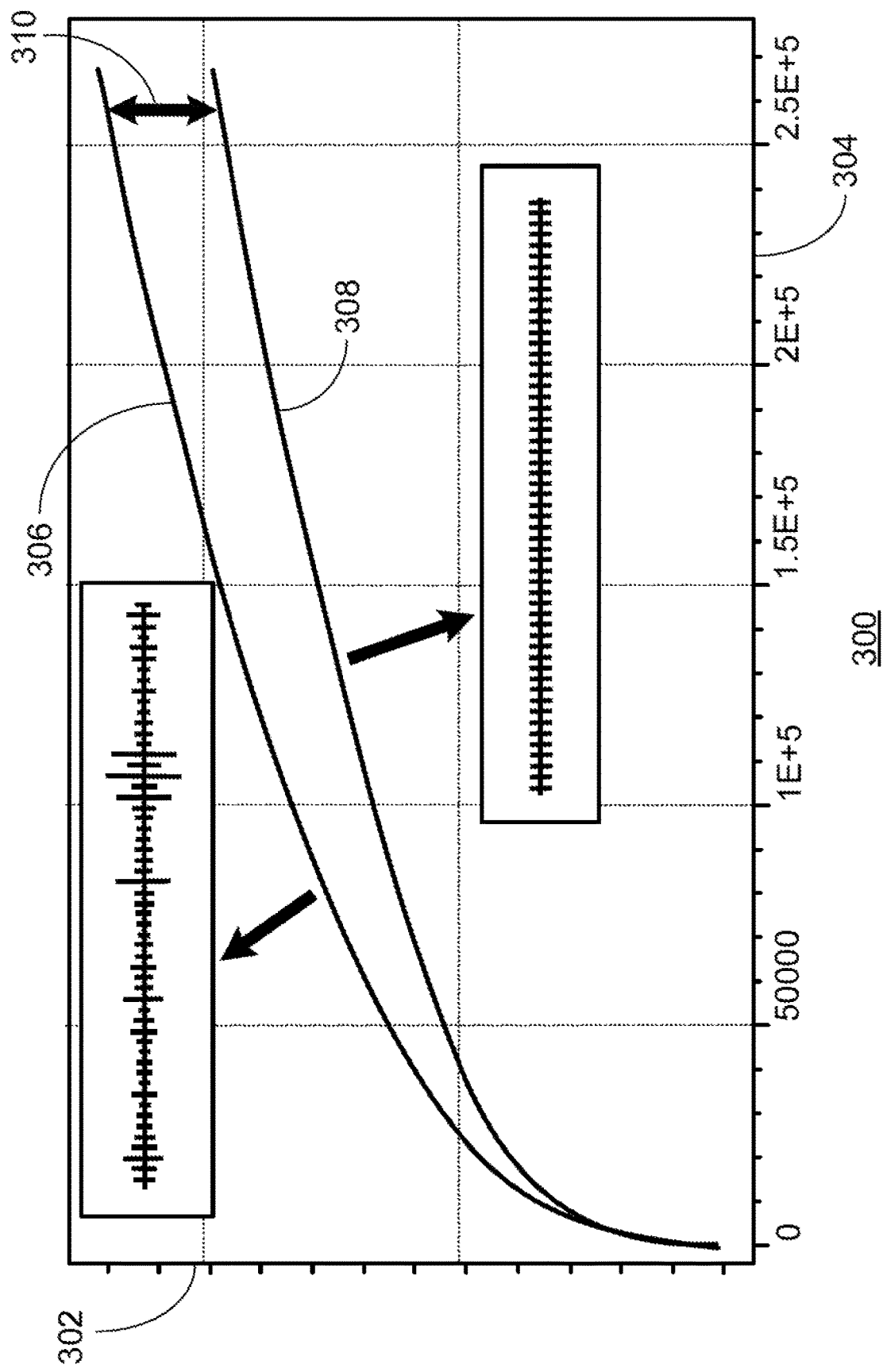
FIG. 3 is an estimated production plot of gas volume over time for uniform and non-uniform distribution of effective fracture lengths along a wellbore trajectory for a fixed fracture height.

FIG. 3 is an estimated production plot 300 of gas volume 302 (standard cubic feet) over time 304 (hours). The plot 300 is for uniform and non-uniform distributions of effective fracture lengths along a wellbore trajectory for a fixed fracture height. The production curve 306 is for the non-uniform case. The production curve 308 is for the uniform case. FIG. 3 gives production forecast of analytical simulation models previously matched or calibrated with field data of FIG. 2A. The model estimates with the non-uniform hydraulic fracture distribution are 20% higher in ultimate recovery than the model with uniform fracture distribution. As mentioned, total fracture surface-area is the same for both models. FIG. 3 shows that the model with non-uniform fracture distribution gives an estimate for EUR that is approximately 20% more (arrow 310) than the model with uniform fracture distribution. In view of these results, it is notable that both cases have the same total effective fracture surface-area.

Field development plans are typically primarily based on cash flow analysis which may depend, for example, on rate and recovery estimates, cost of completion, and number of wells per section. Therefore, information of how effective fracture surface-areas are distributed along the well trajectory may play a beneficial role in improving field development in terms of cluster spacing, well spacing, and re-fracturing.

In summary, certain embodiments provide a description of the distribution of effective hydraulic fracture surface-area along the wellbore trajectory. This knowledge of relative distribution may be beneficial for accurate estimation of ultimate recovery. A correct estimation of ultimate recovery can be advantageous for project economics and improved field development. Embodiments of the present techniques may improve predictions of production rates and recovery of hydrocarbon.

Figure 4:
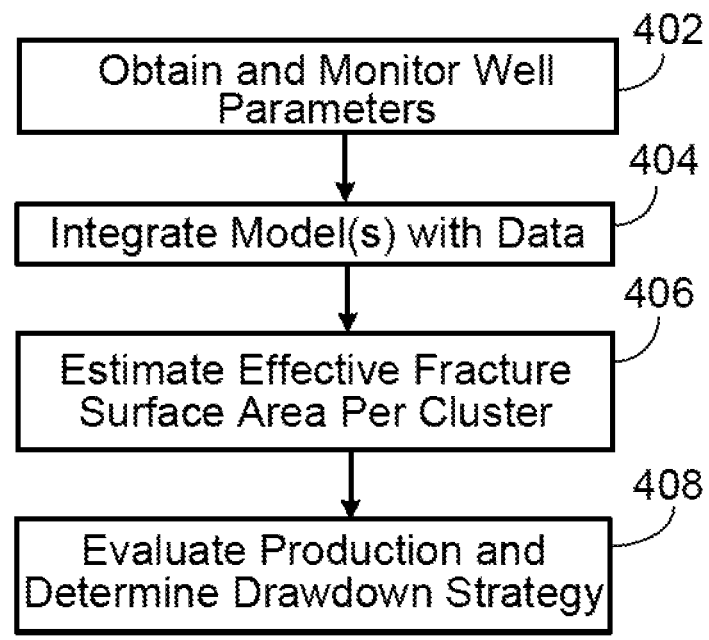
FIG. 4 is a block flow diagram of a computer-implemented method of estimating effective fracture surface-area per cluster of hydraulic fractures.

FIG. 4 is a method 400 of estimating effective fracture surface-area per each cluster (for example, perforation cluster) of hydraulic fractures of a well. The well may include a wellbore in a geological formation. The clusters may be associated with the wellbore. In some embodiments, the well is a hydraulically-fractured deviated or horizontal well in an unconventional reservoir. The hydraulically-fractured well may include multiple clusters of hydraulic fractures along the wellbore. In implementations, the multiple clusters are formed through respective wellbore perforations. The hydraulically-fractured well may include multiple clusters of hydraulic fractures formed through wellbore perforations along the wellbore.

At block 402, the method includes obtaining and monitoring well parameters. For example, well parameters obtained may include the wellbore trajectory direction and fracture cluster details such as fracture cluster spacing. Further, the method may include obtaining well parameter data such as petrophysical data for the geological formation (surrounding the wellbore) from which hydrocarbons are produced. Petrophysical data may include physical and chemical properties of rocks and the fluids contained in the rocks, and may be directed to properties relating to the pore system and pore fluid distribution and flow characteristics.

Further, the monitoring may include sensing and measurement systems such as fiber-optic distributed monitoring. Certain embodiments may incorporate data from fiber-optic monitoring collected in real-time or time-delayed. The parameters monitored and measured may include pressure, temperature, and production (fluid) flow rates, at one or more locations along the wellbore length. The locations for distributed monitoring may be specified or selected in conjunction with analytical or numerical models, simulation models, and equation solutions. In addition, the data collection may include data from tracer injection tests and production logging.

At block 404, the method includes integrating model(s) or model solution(s) with data such as with the data collected in block 402 to give total effective fracture surface-area and a relative distribution (for example, non-uniform) of the effective fracture surface-area along the wellbore trajectory. An analysis may include reservoir engineering model or reservoir engineering techniques (for example, RTA, numerical simulations, and material balance) to determine the overall effective fracture surface-area of the total hydraulic fractures associated with the wellbore. Characterization of hydraulic fractures in terms of their height, half-length, and conductivity, may be involved. The models may include analytical or numerical models and flow simulation models. The models may include simulation models or flow models to determine the relative distribution of the effective fracture surface-area along the wellbore trajectory. An example of analytical linear flow-model solution for a hydraulically fractured well includes employment of Equations 1.1, 1.2, 1.3, and 1.4 (and also with Equations 1.5, 1.6, and 1.7) given earlier. These models and the RTA analysis may receive as inputs (or otherwise be integrated with) data from block 402.

The estimating of total effective fracture surface-area may include estimating total effective fracture surface-area of clusters of hydraulic fractures associated with the wellbore of the hydraulically-fractured well. The estimating of relative distribution may include estimating relative distribution of effective fracture surface-area of the clusters along the wellbore. To estimate total effective fracture surface-area associated with the wellbore may include to estimate the total effective fracture surface-area via a reservoir engineering model or via wellbore monitoring, or a combination thereof. To estimate total effective fracture surface-area associated with the wellbore may include to estimate the total effective fracture surface-area via RTA. The relative distribution of effective fracture surface-area along the wellbore may be estimated via an analytical model or numerical model, or via distributed monitoring data, or any combinations thereof.

At block 406, the method includes determining (for example, calculating or estimating, or both) the effective fracture surface-are per cluster of hydraulic fractures along the wellbore. This determination may be implemented by integrating reservoir engineering analysis with distributed reservoir monitoring data along the wellbore trajectory, as discussed with respect to blocks 402 and 404. To estimate effective fracture surface-area per cluster may be to estimate fracture surface-area per cluster of hydraulic fractures along the wellbore correlative with the total effective fracture surface-area and the relative distribution. The determination may involve constraining the relative distribution of effective fracture surface-areas within the total effective fracture surface-area estimated via the RTA performed in block 404. The estimated effective fracture surface-area per cluster may be fitted to the total effective fracture surface-area. The estimated production per cluster may also be similarly constrained.

At block 408, the method includes evaluating well production and drawdown. The method may improve rate and recovery estimates from hydraulically fractured horizontal wells in an unconventional reservoir. The method may observe and analyze how wellbore flow dynamics change with increasing depletion. The method may obtain effective fracture surface-area and conductivity with different depletion scenarios. Reservoir pressure at the respective locations of fracture clusters may be considered. In particular, the evaluation may recognize that reservoir pressure and well pressure at each cluster may be different. Therefore, for a given cluster, the surface areas and production rates per cluster may be considered and calculated at each cluster and be different among the clusters. Again, such data and evaluations can aid development of drawdown strategy. Moreover, the method may consider or determine conductivity of hydraulic fractures due to closure and how individual contribution of each cluster to the total production flow changes with pressure depletion. Although promoting depletion may tend to increase the flow, an associated reduction in effective fracture surface-area may counter some of the increase in flow. In all, these aforementioned features may be utilized to evaluate and improve drawdown strategy to increase rates or recovery. Predictions of rates and recovery may be improved with the additional information on fracture surface-area distribution along the wellbore trajectory including per cluster. The method may determine a drawdown strategy in response to reduction in the effective fracture surface-area per cluster over time or with depletion, or both.

Figure 5:
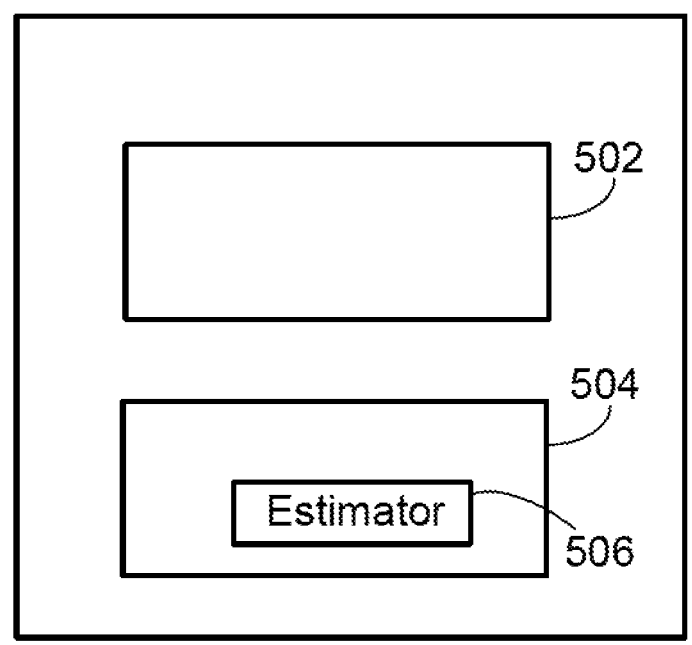
FIG. 5 is a computing system for determining effective fracture surface-area per cluster of hydraulic fractures.

FIG. 5 is a computing system 500 having a processor 502 and memory 504 storing an estimator 506 which may be code (for example, logic and instructions) executed by the processor 502. The estimator 506 when executed may direct the processor 502 to determine effective fracture surface-area per cluster of hydraulic fractures of a hydraulically-fractured well, as discussed later.

The computing system 500 may be single computing device, a server, a desktop, a laptop, multiple computing devices or nodes, a distributed computing system, or a control system or component of a control system. The processor 502 may be one or more processors, and each processor may have one or more cores. The hardware processor(s) 502 may include a microprocessor, a central processing unit (CPU), or a graphics processing unit (GPU). The memory 504 may include volatile memory (for example, cache and random access memory or RAM), nonvolatile memory (for example, a hard drive, solid-state drive, and read-only memory or ROM), and firmware.

In embodiments, the computing system 500 is programmed via code (including the estimator 506) stored in memory 504 and executed by the processor 502 to estimate effective fracture surface-area along a wellbore trajectory. The determination may include effective fracture surface-area per cluster of hydraulic fractures. To do so in certain embodiments, the code (including the estimator 506) facilitates the computing system to: (1) estimate total effective fracture surface-area associated with a wellbore of the hydraulically-fractured well; and (2) estimate relative distribution of effective fracture surface-area along the wellbore via an analytical model or numerical model. To estimate the relative distribution may further include to estimate the relative distribution via distributed monitoring data along the wellbore. In implementations, the relative distribution is non-uniform. To estimate the total effective fracture surface-area associated with the wellbore may include to estimate the total effective fracture surface-area via a reservoir engineering model or via wellbore monitoring, or a combination thereof. The total effective fracture surface-area may be estimated via RTA.

The computing system 500 via the code (including the estimator 506) may estimate effective fracture surface-area per cluster of hydraulic fractures along the wellbore correlative with the total effective fracture surface-area and the relative distribution. To estimate effective fracture surface-area per cluster may include to estimate effective fracture surface-area per perforation cluster of hydraulic fractures along the wellbore correlative with the total effective fracture surface-area and the relative distribution. In addition, the code may further facilitate the computing system 500 to evaluate production flow of the well and determine a drawdown strategy for the well, including in view of the relative distribution and the estimated fracture surface-area per cluster. The code may facilitate the computing system 500 to perform actions discussed throughout the present disclosure.

The computing system 500 improves, for example, the technologies of well performance evaluation and the production of hydrocarbons (for example, natural gas, and crude oil) from a geological formation. In addition, the computing system 500 is an improved computing system 500 via the code (including the estimator 506) in determining effective fracture surface-area per cluster of hydraulic fractures. Such is unconventional in that the fracture surface-area per cluster has generally been an unknown.

Figure 6:
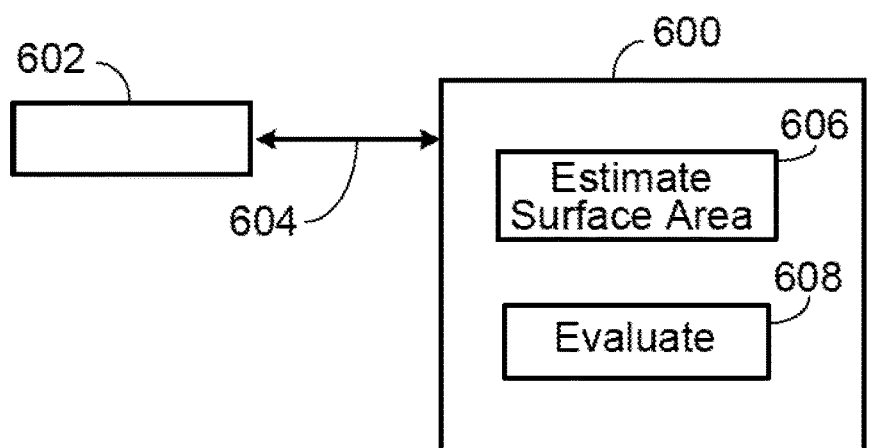
FIG. 6 is a block diagram depicting a tangible, non-transitory, computer (machine) readable medium to facilitate modeling and prediction of proppant embedment in reservoir formation rock.

FIG. 6 is a block diagram depicting a tangible, non-transitory, computer (machine) readable medium 600 to facilitate determining effective fracture surface-area of hydraulic fractures. The computer-readable medium 600 may be accessed by a processor 602 over a computer interconnect 604. The processor 602 may be a controller, a control system processor, a controller processor, a computing system processor, a server processor, a compute-node processor, a workstation processor, a distributed-computing system processor, a remote computing device processor, or other processor. The processor 602 may be analogous to the processor 502 of FIG. 5, or other processors.

The tangible, non-transitory computer-readable medium 600 may include executable instructions or code to direct the processor 602 to perform the operations or actions of the techniques described, such as to estimate effective fracture surface-area of clusters of hydraulic fractures. The various executed code components discussed may be stored on the tangible, non-transitory computer-readable medium 600, as indicated in FIG. 6.

For example, estimate surface-area code 606 may include executable instructions to direct the processor 602 to: (1) estimate total effective fracture surface-area associated with a wellbore of a hydraulically-fractured well via rate transient analysis (RTA); (2) estimate relative distribution of effective fracture surface-area along the wellbore via an analytical model or numerical model, and where the relative distribution is non-uniform; and (3) estimate effective fracture surface-area per cluster of hydraulic fractures along the wellbore correlative with the total effective fracture surface-area and the relative distribution. To estimate relative distribution may include to estimate effective fracture surface-area along the wellbore via distributed monitoring data. Moreover, in implementations, the hydraulically-fractured well includes multiple clusters of hydraulic fractures along the wellbore, and where the estimated effective fracture surface-area varies per cluster. Evaluate code 608 may direct the processor 602 to evaluate production flow of the well and determine a drawdown strategy for the well, in view of output via the estimate surface-area code 606. It should be understood that any number of additional executable code components not shown in FIG. 6 may be included within the tangible non-transitory computer-readable medium 600 depending on the application.

Figure 7:
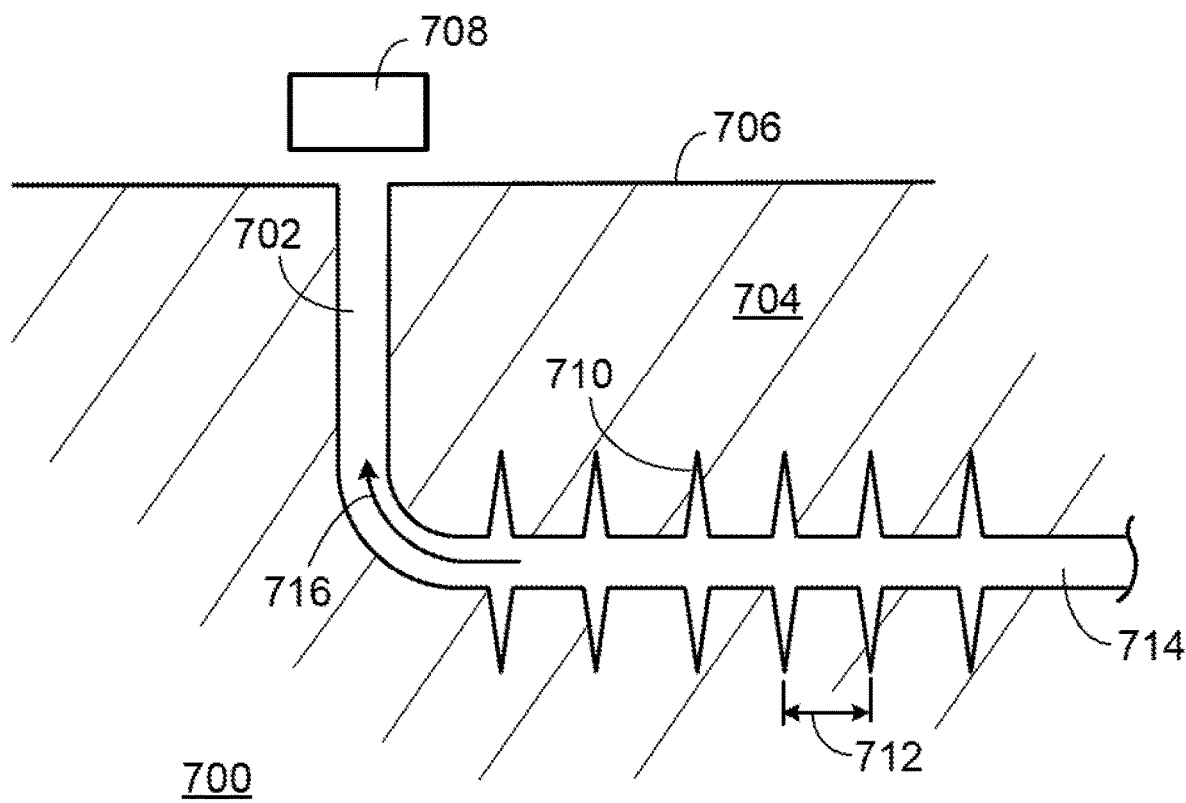
FIG. 7 is a diagram of well site having a horizontal wellbore with multiple perforated clusters of hydraulic fractures along the wellbore.

FIG. 7 is a well site 700 having a wellbore 702 formed (including drilled) in a geological formation 704 through the Earth surface 706. The geological formation 704 may have hydrocarbons such as crude oil and natural gas. The well site 700 includes surface equipment 708 that may form and operate the wellbore 702. The forming of the wellbore 702 via the surface equipment 708 may include drilling a borehole as the wellbore 702, casing the wellbore 702, and cementing the annulus between the casing and the geological formation 704. The forming of the wellbore 702 may include perforating the casing and the cement into the geological formation 704. Hydraulic fracturing may be performed through the perforations into the geological formation 704 near the wellbore 702 to form perforation clusters 710 of hydraulic fractures. The spacing 712 between the clusters 710 may vary. The hydraulic fracturing may involve injecting water, proppants (for example, sand), and chemicals under pressure through the wellbore perforations into the geological formation 704. In the illustrated implementation, the wellbore 702 may continue 714 in the horizontal orientation further into the geological formation 704. Wellbore 702 production may be initiated and maintained. In the production, hydrocarbons (for example, crude oil or natural gas, or both) may flow from the geological formation 704 through the perforation clusters 710 into the wellbore 702. The produced hydrocarbon 716 may flow through the wellbore 702 to the Earth surface 706.

As mentioned, the surface equipment 708 may be utilized to drill the wellbore 702, install casing into the wellbore 702, and cement the annulus between the casing (not shown) and the wall of geological formation 704. The surface equipment 708 may include a mounted drilling rig which may be a machine that creates boreholes in the Earth subsurface. To form a hole in the ground, a drill string having a drill bit may be lowered into the hole being drilled. In operation, the drill bit may rotate to break the rock formations to form the hole as a borehole or wellbore 702. In the rotation, the drill bit may interface with the ground or formation 704 to grind, cut, scrape, shear, crush, or fracture rock to drill the hole.

Some embodiments model and predict hydraulic-fracture performance in hydrocarbon reservoirs. Such may involve computer-based procedures and modeling processes for numerical simulation and modeling of hydraulic fractures in a hydrocarbon reservoir. Applications may include improving well performance and profitability, and increasing recoverable hydrocarbons extracted from oil and gas reservoirs for vertical, horizontal, and deviated wells. Examples may build on measuring production contribution from each cluster along with pressure and temperature profiles to calculate fracture surface-area per each cluster. Thus, a product of the techniques may be distribution of fracture surface areas along the trajectory. Then, this information may be utilized to forecast production more accurately.

Embodiments evaluate geological formations that are heterogeneous reservoir systems and generally focus on hydraulically fractured wells. A focus may be integrating real-time or snapshot data (for example, collected distributed along the trajectory via fiber optics or production logs) with analytical or numerical models to estimate surface areas for each fracture cluster. This information may then be employed to obtain better estimates of total recovery. Implementations may estimate fracture cluster surface-area based at least in part on integrating RTA with well logs, real-time distributed data (for example, collected via fiber optics), and production logs. Certain implementations utilize real time or snapshot data showing distribution of production from each cluster to facilitate that surface area per cluster can be estimated. Implementations may integrate reservoir parameters from well logs or a geological model with measured or derived well-production data along the wellbore trajectory to estimate fracture area per each cluster.

Some embodiments that determine effective fracture surface-area per cluster: (1) consider variation of fracture surface-area along the wellbore trajectory but not a single average fracture surface-area for all clusters; (2) do not consider pressure transient analysis (PTA); (3) focus on hydraulic fracture surface-areas along the wellbore trajectory and not on fracture conductivity; (4) do not perform production decline analysis or specifically production transient analysis; or (5) do not employ fracture propagation models, or any combinations thereof. However, other embodiments may consider or employ these features. Embodiments generally do not model fracture propagation or calibration of such a model with well data. Some implementations may utilize (not necessarily) results of a such a propagation model as input as a starting point, and improve surface-area estimates for each cluster based on production profile data along the trajectory.

RTA may be a complement to pressure transient analysis (PTA) with availability of pressure and rate data. RTA can increase the area of investigation when compared to PTA alone, and generally without deferred production. The long-term production can be modeled and forecasted based on real models as opposed to an empirical function in some instances if desired. RTA, unlike traditional reservoir engineering techniques such as decline curve analysis (DCA), may incorporate both fluid rates and flowing pressures to understand the fluid flow in the reservoir. Unlike PTA, which may require shut-ins, RTA may rely on flowing pressures so that the well typically is not shut-in during analysis. In general, RTA may facilitate evaluation further into the reservoir than PTA because RTA may involve analyzing production history. RTA can be used to conduct a "flowing material balance" on the production data. In conclusion, with flowing pressure data generally readily available and accessible, RTA may garner information previously unavailable, produce more realistic forecasts, and aid in numerical simulation.

RTA can loosely be characterized as a modern DCA. RTA may plot pseudo normalized pressure. DCA may be a forecasting technique that predicts by history matching of rate-time data on an appropriate type curve. In contrast, RTA is not based on applying a purely empirical equation to be analyzed with statistical approaches which often leads to unrealistic (unreliable) forecast and reserve estimate. Instead, RTA can give estimates of reservoir parameters with the aforementioned monitoring data and with available (for example, weekly or monthly) production data. Once reservoir characteristics are determined using RTA, a reservoir model may then be constructed to forecast future production scenarios.

A challenge in analyzing unconventional shale reservoirs is that flow regimes in such reservoirs generally remain in transient flow. This aspect of unconventional shale reservoirs may make challenging to estimate recoverable resources along with reservoir properties such as fracture half length, permeability, drainage area, and fracture conductivity. Conventional DCA may assume constant flowing bottom-hole pressure, drainage area, permeability, skin, and existence of boundary dominated flow. Most of these assumptions are typically no longer valid in unconventional reservoirs. Therefore, it may be beneficial that not only rate, but also pressure and other reservoir parameters are taken into account to evaluate unconventional wells to determine the flow capacity of the reservoir in linear transient flow.

Gas initial in place (GIIP) may refer to the total amount of gas present initially in the underground of a gas field. Part of the GIIP in an explored gas field can be recovered. Generally, the recovery of gas from the GIIP in a typical gas field ranges from as low as 60% to as high as 90%. The EUR of a petroleum source may be the sum of the proven reserve at a specific time and the cumulative production up to that time. Proven reserve may refer to the quantity of gas in a gas reservoir which can be estimated to be commercially recoverable from a reservoir under the present economic and operating conditions.

Reservoir modeling may be the act of producing a model of a reservoir. The model can include geological factors and fluid characteristics of the reservoir, and may involve reservoir characterization. Reservoir modeling may involve the construction of a computer model of a petroleum reservoir for the purposes of improving estimation of reserves of the field, making decisions regarding the development of the field, predicting future production of the field, placing additional wells in the field, and evaluating alternative reservoir management scenarios. Simulation of petroleum reservoir performance may refer to the construction and operation of a mathematical model whose behavior assumes the actual reservoir behavior. A mathematical model may be a set of equations that, subject to certain assumptions, describes the physical processes active in the reservoir. Although the model itself may lack the reality of the reservoir, the behavior of a valid model may simulate (assume the appearance of) the actual reservoir. A purpose of simulation may be estimation of field performance (for example, oil recovery) under one or more producing schemes. Whereas the field can be produced only once, a model can be produced or run many times. Observation of model results that represent different producing conditions aids selection of an optimal or improved set of producing conditions for the reservoir.

In conclusion, an embodiment is a method of a computer-implemented workflow that includes determining effective fracture surface-area per cluster (for example, perforation cluster) of hydraulic fractures of a hydraulically-fractured well. The hydraulically-fractured well may include multiple clusters of hydraulic fractures formed through wellbore perforations along the wellbore. The determining of the effective fracture surface-area per cluster includes: (a) estimating total effective fracture surface-area associated with a wellbore of the hydraulically-fractured well, such as by rate transient analysis (RTA); and (b) estimating relative distribution of effective fracture surface-area along the wellbore. The estimating of total effective fracture surface-area may include estimating total effective fracture surface-area of clusters of hydraulic fractures associated with the wellbore of the hydraulically-fractured well, and where estimating relative distribution may include estimating relative distribution of effective fracture surface-area of the clusters along the wellbore. The relative distribution is typically non-uniform. The estimating of relative distribution may include estimating effective fracture surface-area along the wellbore via an analytical flow model or numerical flow model. The estimating of relative distribution may include estimating effective fracture surface-area along the wellbore via distributed monitoring data along the wellbore. The method may include integrating the analytical or numerical models with the distributed monitoring data. The effective fracture surface-area per cluster of hydraulic fractures along the wellbore is estimated correlative with the total effective fracture surface-area and the relative distribution. The estimating of the effective fracture surface-area per cluster may include integrating an output from the estimating of the total effect fracture surface-area with an output from the estimating of the relative distribution. The estimating of the effective fracture surface-area per cluster may include constraining the relative distribution with the total effective fracture surface-area.

The hydraulically-fractured well generally includes multiple perforation-clusters of hydraulic fractures along the wellbore, where determining effective fracture surface-area per perforation-cluster includes determining effective fracture surface-area per each perforation-cluster of hydraulic fractures of the hydraulically-fractured well, and where the effective fracture surface-area of a first perforation-cluster is different than the effective fracture surface-area of a second perforation-cluster. The method may include applying the workflow for different time periods in production history. The method may include updating a production forecast in response to the effective fracture surface-area per perforation-cluster.

Another embodiment is a computer-implemented method including obtaining data of well parameters of a hydraulically-fractured well, and integrating a model(s) (for example, RTA, analytical model, or numerical model) with the data. The obtaining of the data may include distributed monitoring along a wellbore of the well. The hydraulically-fractured well includes multiple clusters of hydraulic fractures along the wellbore. The computer-implemented method may include estimating effective fracture surface-area per cluster of hydraulic fractures along a wellbore of the hydraulically-fractured well, such as based at least in part on the model(s) and the data. The hydraulically-fractured well typically includes multiple clusters (for example, perforation clusters) of hydraulic fractures along the wellbore, and where the estimated effective fracture surface-area varies per cluster. The method may include determining a drawdown strategy in response to the effective fracture surface-area per cluster. The method may include determining a drawdown strategy in response to reduction in the effective fracture surface-area per cluster over time or with depletion, or both.

Yet another embodiment is a computing system for determining effective fracture surface-area per cluster of hydraulic fractures of a hydraulically-fractured well. The computing system includes a processor and memory storing code executable by the processor to direct the computing system to: (1) estimate total effective fracture surface-area associated with a wellbore of the hydraulically-fractured well via rate transient analysis (RTA); (2) estimate relative distribution (non-uniform) of effective fracture surface-area along the wellbore via a model; and (3) estimate effective fracture surface-area per perforation cluster of hydraulic fractures along the wellbore correlative with the total effective fracture surface-area and the relative distribution. To estimate relative distribution may involve to estimate effective fracture surface-area along the wellbore via distributed monitoring data.

A number of implementations have been described. Nevertheless, it will be understood that various modifications may be made without departing from the spirit and scope of the disclosure.

What is claimed is:

1. A method of a computer-implemented workflow for a hydraulically-fractured well having perforation clusters of hydraulic fractures along a wellbore, comprising:
    determining effective fracture surface-area per each perforation cluster of hydraulic fractures along the wellbore of the hydraulically-fractured well, the determining comprising:
        estimating total effective fracture surface-area of the perforation clusters of hydraulic fractures along the wellbore of the hydraulically-fractured well;
        estimating relative distribution of effective fracture surface-area for the perforation clusters of hydraulic fractures along the wellbore; and
        estimating the effective fracture surface-area per each perforation cluster of hydraulic fractures along the wellbore correlative with the total effective fracture surface-area and the relative distribution.

2. The method of claim 1, wherein estimating the total effective fracture surface-area comprises estimating the total effective fracture surface-area of the perforation clusters of hydraulic fractures collectively along the wellbore of the hydraulically-fractured well, and wherein the relative distribution is non-uniform in that relative contribution of each perforation cluster individually to the total effective fracture surface-area varies among the perforation clusters along the wellbore.

3. The method of claim 1, wherein each perforation cluster is formed through a wellbore perforation, respectively, along the wellbore, wherein estimating the relative distribution comprises estimating the relative distribution of effective fracture surface-area for the perforation clusters via an analytical model or a numerical model, or both, and via distributed monitoring data, and wherein flow in the analytical model or the numerical model, or both, comprises produced flow of hydrocarbon from a geological formation through the perforation clusters of hydraulic fractures into the wellbore.

4. The method of claim 3, wherein the relative distribution is non-uniform, such that the effective fracture surface-area varies among respective perforation clusters, and wherein the distributed monitoring data is collected via distributed acoustic sensing (DAS), distributed temperature sensing (DTS), or production logging (PLT), or any combinations thereof.

5. The method of claim 1, wherein estimating total effective fracture surface-area comprises estimating total effective fracture surface-area by rate transient analysis (RTA) and pressure transient analysis (PTA) or by RTA and not PTA.

6. The method of claim 1, wherein estimating relative distribution comprises estimating effective fracture surface-area along the wellbore via an analytical flow model or numerical flow model, or both, and wherein the relative distribution is non-uniform.

7. The method of claim 6, wherein estimating relative distribution comprises estimating effective fracture surface-area along the wellbore via distributed monitoring data collected in real time during production of hydrocarbon from the hydraulically-fractured well, and wherein the relative distribution being non-uniform comprises the effective fracture surface-area varying among respective perforation clusters.

8. The method of claim 7, wherein estimating the effective fracture surface-area per each perforation cluster comprises integrating an output from the estimating of the total effect fracture surface-area with an output from the estimating of the relative distribution, and wherein the distributed monitoring data is collected via a fiber optic cable or multiple sensors, or a combination thereof, installed along the wellbore.

9. The method of claim 1, comprising relying on values of the effective fracture surface-area per each perforation cluster as determined to estimate hydrocarbon rate and recovery from the hydraulically-fractured well, wherein estimating the effective fracture surface-area per each perforation cluster comprises constraining the relative distribution with the total effective fracture surface-area.

10. The method of claim 1, wherein estimating the effective fracture surface-area per each perforation cluster correlative with the total effective fracture surface-area and the relative distribution comprises integrating a reservoir-engineering simulation model with distributed monitoring data collected from along the wellbore, and wherein effective fracture surface-area of a first perforation cluster of the perforation clusters is different than effective fracture surface-area of a second perforation cluster of the perforation clusters.

11. The method of claim 10, comprising updating a production forecast in response to the effective fracture surface-area per each perforation cluster as determined, and wherein the distributed monitoring data comprises pressure, temperature, flow rate, velocity, or fluid density, or any combinations thereof, of hydrocarbon produced through the wellbore.

12. The method of claim 1, comprising:
applying the computer-implemented workflow for different time periods in production history; and
determining a drawdown strategy in response to reduction in the effective fracture surface-area per cluster over time.

13. A computer-implemented method comprising:
obtaining data of well parameters of a hydraulically-fractured well;
integrating a model with the data; and
estimating effective fracture surface-area per each perforation cluster of hydraulic fractures along a wellbore of the hydraulically-fractured well, wherein the hydraulically-fractured well comprises multiple perforation clusters of hydraulic fractures along the wellbore, and wherein estimating effective fracture surface-area per each perforation cluster is based at least in part on the model and the data.

14. The method of claim 13, wherein the multiple perforation clusters are formed through respective wellbore perforations, and wherein obtaining the data comprises distributed monitoring along the wellbore.

15. The method of claim 14, wherein the model comprises rate transient analysis (RTA), wherein the distributed monitoring comprises distributed acoustic sensing (DAS), distributed temperature sensing (DTS), or production logging (PLT), or any combinations thereof, and wherein the effective fracture surface-area as estimated for a first perforation cluster of the multiple perforation clusters is different than the effective fracture surface-area as estimated for a second perforation cluster of the multiple perforation clusters.

16. The method of claim 14, comprising relying on values of the effective fracture surface-area per each perforation cluster as estimated to estimate hydrocarbon production rate and hydrocarbon production recovery from the hydraulically-fractured well, wherein the model comprises an analytical model or a numerical model, and wherein the distributed monitoring is performed in real time during production of hydrocarbon from the hydraulically-fractured well.

17. The method of claim 13, wherein each perforation cluster of hydraulic fractures comprises a group of hydraulic fractures formed via a respective perforation along the wellbore.

18. The method of claim 17, comprising determining a drawdown strategy in response to reduction in the effective fracture surface-area of a perforation cluster of the multiple perforation clusters over time or with depletion, or both.

19. The method of claim 17, wherein the effective fracture surface-area per each perforation cluster as estimated varies among the multiple perforation clusters.

20. A computing system comprising:
an estimator to determine effective fracture surface-area of each perforation cluster of perforation clusters of hydraulic fractures along a wellbore of a hydraulically-fractured well, wherein to determine comprises to:
estimate total effective fracture surface-area of the perforation clusters along the wellbore of the hydraulically-fractured well, wherein each perforation cluster of hydraulic fractures of the perforation clusters comprises a group of hydraulic clusters formed via a respective perforation;
estimate relative distribution of effective fracture surface-area along the wellbore via an analytical model or numerical model, wherein the relative distribution is non-uniform; and
estimate effective fracture surface-area of each perforation cluster of hydraulic fractures along the wellbore correlative with the total effective fracture surface-area and the relative distribution.

21. The computing system of claim 20, wherein to estimate total effective fracture surface-area associated with the wellbore comprises to estimate the total effective fracture surface-area via a reservoir engineering model or via wellbore monitoring, or a combination thereof, and wherein the total effective fracture surface-area comprises a combined amount of the effective fracture surface-area of each perforation cluster of hydraulic fractures along the wellbore.

22. The computing system of claim 20, wherein to estimate the total effective fracture surface-area comprises rate transient analysis (RTA), and wherein the estimator to rely on values of the effective fracture surface-area of each perforation cluster as estimated to estimate hydrocarbon production rate and hydrocarbon production recovery from the hydraulically-fractured well.

23. The computing system of claim 20, wherein to estimate relative distribution comprises to estimate effective fracture surface-area along the wellbore via distributed monitoring data collected during production of hydrocarbon from the hydraulically-fractured well, and wherein the relative distribution being non-uniform indicates a changing value of effective fracture surface-area along the wellbore.

24. The computing system of claim 23, comprising a processor and memory storing code executable by the processor, wherein the code comprises the estimator, and wherein the distributed monitoring data is collected via distributed acoustic sensing, distributed temperature sensing, or production logging, or any combinations thereof.

25. A computing system for determining effective fracture surface-area per perforation cluster of hydraulic fractures of a hydraulically-fractured well, comprising:
  a processor; and
  memory storing code executable by the processor to direct the computing system to:
    estimate total effective fracture surface-area associated with a wellbore of the hydraulically-fractured well via rate transient analysis (RTA);
    estimate relative distribution of effective fracture surface-area along the wellbore via a model, and wherein the relative distribution is non-uniform; and
    estimate effective fracture surface-area per perforation cluster of perforation clusters of hydraulic fractures along the wellbore correlative with the total effective fracture surface-area and the relative distribution.

26. The computing system of claim 25, wherein to estimate relative distribution comprises to estimate effective fracture surface-area along the wellbore via distributed monitoring data collected during production of hydrocarbon from the hydraulically-fractured well, and wherein each perforation cluster of the perforation clusters comprises a group of hydraulic fractures formed via wellbore perforations, respectively, along the wellbore.

27. A non-transitory, computer-readable medium comprising instructions executable by a processor of a computing device to:
  estimate total effective fracture surface-area associated with a wellbore of a hydraulically-fractured well via rate transient analysis (RTA), wherein the hydraulically-fractured well comprises perforation clusters of hydraulic fractures along the wellbore;
  estimate relative distribution of effective fracture surface-area along the wellbore via an analytical model or numerical model, wherein the relative distribution is non-uniform; and
  estimate effective fracture surface-area per each perforation cluster of hydraulic fractures of the perforation clusters along the wellbore correlative with the total effective fracture surface-area and the relative distribution, wherein each perforation cluster is formed via a respective perforation of the wellbore.

28. The non-transitory, computer-readable medium of claim 27, wherein to estimate relative distribution comprises to estimate effective fracture surface-area along the wellbore via distributed monitoring data collected during production of hydrocarbon through the wellbore.

29. The non-transitory, computer-readable medium of claim 28, wherein the relative distribution being non-uniform comprises the estimated effective fracture surface-area varies per perforation cluster, wherein the estimate effective fracture surface-area for a first perforation cluster of the perforation clusters is different than the estimate effective fracture surface-area for a second perforation cluster of the perforation clusters, and wherein the distributed monitoring data is collected via distributed sensing or production logging, or a combination thereof.

* * * * *